UNITED STATES PATENT OFFICE.

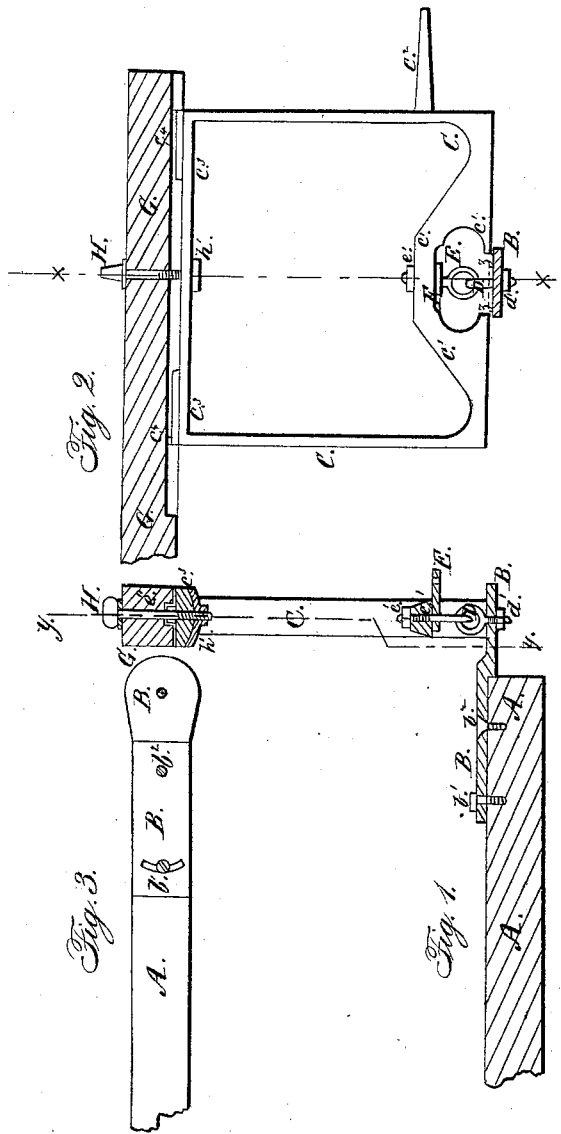

SILAS M. WHITNEY, OF GALESBURG, ILLINOIS.

IMPROVEMENT IN COUPLINGS FOR CULTIVATORS.

Specification forming part of Letters Patent No. 59,698, dated November 13, 1866.

*To all whom it may concern:*

Be it known that I, SILAS M. WHITNEY, of Galesburg, in the county of Knox and State of Illinois, have invented a new and useful Improvement in Couplings for Cultivators; and I do hereby declare that the following is a full, clear, and exact description thereof, which will enable others skilled in the art to make and use the same, reference being had to the accompanying drawings, forming a part of this specification, in which—

Figure 1 is a vertical longitudinal section of my improved coupling, taken through the line $x\,x$, Fig. 2. Fig. 2 is a cross-section of the same, taken through the line $y\,y$, Fig. 1. Fig. 3 is a detail sectional view of the same, taken through the line $z\,z$, Fig. 2.

Similar letters of reference indicate like parts.

My invention consists of an adjustable rectangular frame, two eyebolts, and a connecting-bar, constructed as hereinafter more fully described, in combination with each other and with the plow-beam and frame or axle-tree of the cultivator, for the purpose of connecting two double or single plows to cultivate corn.

A is the beam, to which plows of any desired form may be attached in the ordinary manner.

B is the connecting-bar, which is bent as shown in Figs. 1 and 3, and the rear part of which is attached to the beam A by screws or bolts $b^1\,b^2$, the rear bolt, $b^1$, passing through a slot in the rear end of the bar B, as shown in Fig. 3, so that the direction of the beam A may be varied to accommodate it to the draft of the plows, should they be so formed as not to draw in a direct line.

By making the bar B in this form the depth of the plows may be varied by turning the bar over and attaching it to the beam A with the other side upward, or by attaching it to the under side of the said beam, as may be desired.

C is the frame, which is usually made about sixteen inches in length and nine inches in breadth, the lower side, $c^1$, of which is made in the form shown in Fig. 2—that is to say, the lower end bar, $c^1$, of said frame is made heavier in the middle, or with its middle part projecting upward. The lower side of the said middle part is then notched or cut away on its under side, so as to form a cavity for the reception of the interlocked eyebolts D and E.

The shank or bolt of the eye D passes down through a hole in the forward end of the bar B, as shown in Fig. 1, and is secured in place by the nut $d'$, as shown. The shank or bolt of the eye E passes up through the center of the end bar, $c^1$, of the frame C, and is secured in place by a nut, $e'$, the said eyes interlocking with each other, as shown in Fig. 1.

By means of the nuts $d'$ and $e'$, the eyebolts D and E may be tightened as the parts become worn, so that the bar B may always be held close up to the under side of the bar $c^1$, as shown in Fig. 2.

$c^2$ is a spindle to which the wheel is attached. F is a small bar projecting in front of the frame C, through a hole in the rear end of which passes the shank or bolt of the eye E, as shown in Fig. 1.

The bar F has a hole through its forward end, for the attachment of the lower end of the draft-bar or brace, the upper end of which is connected to the tongue or frame of the machine in the ordinary manner, and about the construction and arrangement of which there is nothing new.

The upper end, $c^3$, of the frame C is slotted longitudinally, and has long tenons $c^4$ formed upon its upper side near the ends, as shown in Figs. 1 and 2, which enter and work in a groove made in the under side of the axle-tree or frame G.

H is a screw or bolt which passes down through a hole in the timber G, and through the slot in the side $c^3$ of the frame C, and by means of the nut $h$ holds the said frame C securely connected to the said timber.

By loosening the screw H the frame C may be moved in either direction, expanding or contracting the parts of the cultivator, as may be required.

Having thus described my invention, I claim as new and desire to secure by Letters Patent—

The adjustable rectangular frame C, eyebolts D and E, and connecting-bar B, when said parts are constructed substantially as herein shown and described, in combination with the plow-beam A and axle-tree or frame G, as and for the purpose set forth.

SILAS M. WHITNEY.

Witnesses:
JAMES M. McCRANE,
ADNAH WILLIAMS.